ABSTRACT: A slack adjuster for maintaining slack or lost motion to a prescribed minimum in the hand-operated portion of a combined fluid pressure and hand-operated brake apparatus for a railway vehicle, said slack adjuster, which includes a rack and pawl ratchet mechanism, is so arranged in the brake rigging as to be automatically and incrementally adjustable to one of several successive positions, by operation of the fluid pressure portion of the brake apparatus in effecting a brake application next subsequent to each time wear of the brake shoes and other elements of the brake rigging has accumulated a predetermined amount, whereby the length of the slack adjuster is incrementally extended to take up excessive slack in the rigging upon occurrence of each of such adjustments, said ratchet mechanism acting to permit extension of the slack adjuster but prevent retraction thereof. The slack adjuster includes manually operable means for resetting the rack of the ratchet mechanism to its retracted position for shortening the length of said slack adjuster when new brake shoes are installed or other causes for excessive slack have been eliminated.

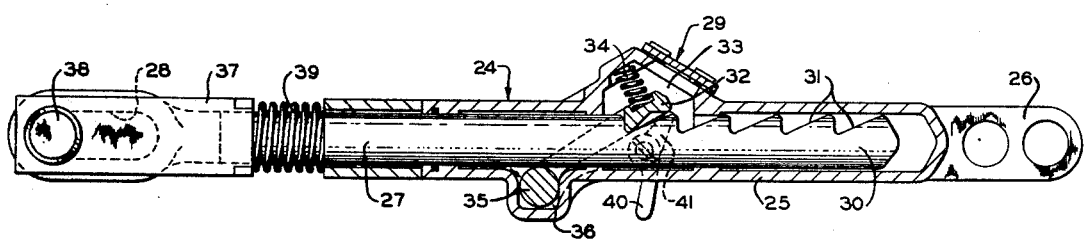

PATENTED JUL 27 1971
3,595,346
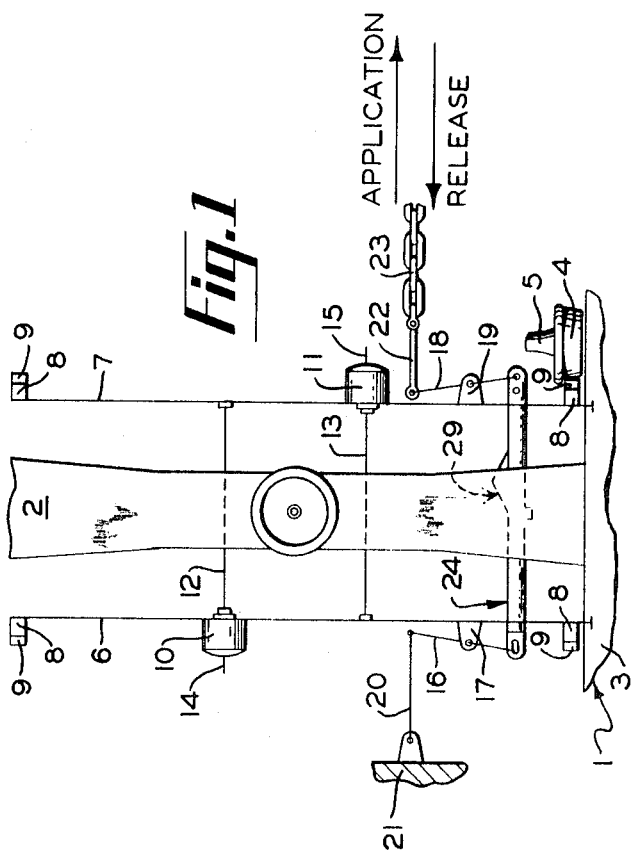
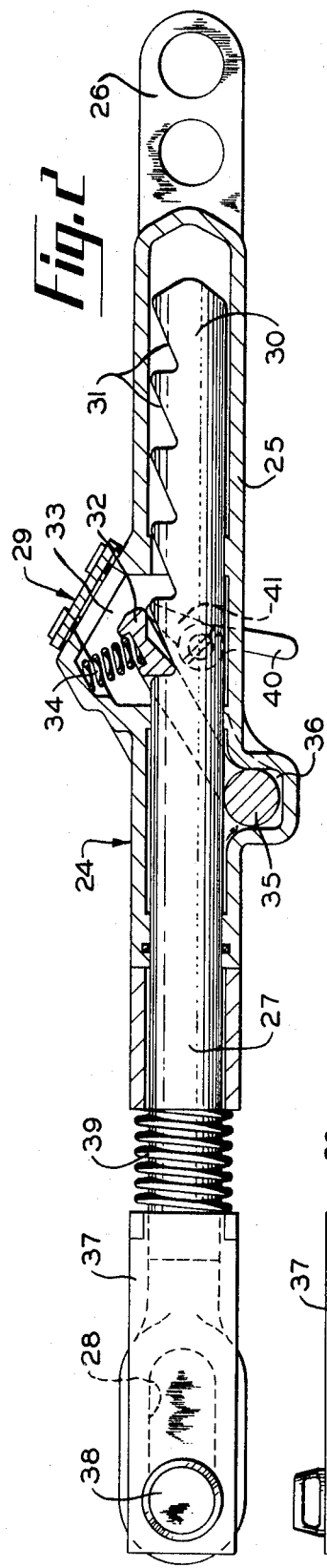
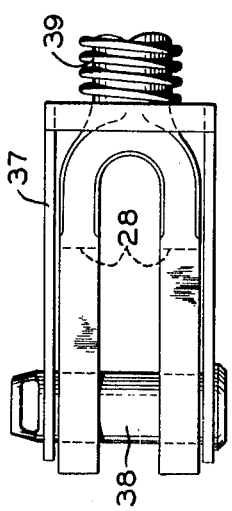
INVENTOR.
WALTER B. KIRK
ANDREW G. HAYDU
BY A.G. Steinmiller
ATTORNEY

SLACK ADJUSTING MECHANISM FOR COMBINED FLUID PRESSURE AND HAND-OPERATED BRAKE APPARATUS

BACKGROUND OF THE INVENTION

Slack adjusters have been widely used for taking up excessive slack in the linkage system of railway vehicle brake apparatus, particularly in such older apparatus wherein the brake cylinder is mounted on the car frame and is situated somewhat remotely from the brakeshoes. With the brake cylinder remotely situated from the brakeshoes, the actuating linkage therebetween, by necessity, usually comprises numerous and lengthy levers as compared to more compact braking apparatus such as the newer truck-mounted type in which the brake cylinders with all necessary linkage are carried on the respective trucks at each end of the car. On the older type apparatus, therefore, any slack due to wear of the wheels, brakeshoes, and link connections is proportionally amplified to an intolerable degree that can be corrected either by replacing the worn parts, probably before their usefulness has been exhausted, or by the use of a slack adjuster device for taking up slack automatically until the worn parts have exhausted their usefulness and are replaced. Use of a slack adjuster on the older type brake apparatus, in taking up slack, also renders the hand-operated portion of the brake apparatus more effective in that less manual manipulation of the hand wheel is required in bringing the brakeshoes into engagement with the wheels.

On the truck-mounted type apparatus, however, because of the necessity of less and shorter linkage, a greater degree of slack due to wear of the brakeshoes, wheels, and link connections can be tolerated, as far as the fluid pressure operated portion of the apparatus is concerned, until the worn parts are replaced after complete exhaustion of their usefulness. Slack beyond a certain degree, however, does become critical and undesirable as concerns the hand-operated portion of the brake apparatus.

SUMMARY OF THE INVENTION

The object of the present invention is to provide a slack adjuster device for use in the hand-operated portion of a combined fluid pressure and hand-operated brake apparatus of the truck-mounted type for a railway vehicle for automatically compensating for excessive slack due to worn brakeshoes, wheels, and linkage connections, to thereby prevent the necessity of excessive manipulation of the hand wheel in making a manual brake application, particularly when the situation is of an emergency nature and demands that the application be effected in the least amount of time possible.

The invention resides in a slack adjuster device intended to replace the connecting link (specifically, the bottom rod) between the live lever and the dead lever of a truck-mounted type brake apparatus, said slack adjuster device comprising an inner member axially movable within and relative to an outer member. The outer member carries a latch mechanism engageable with a notched rod on the inner member in such manner as to prevent retraction of said inner member within the outer member when a manual brake application is effected. On the other hand, the latch mechanism permits cooperative extension of the inner and outer members, with the assistance of a spring acting therebetween, for adjusting the overall length thereof during an application effected by the fluid pressure operated portion of the apparatus, assuming that the slack in the linkage were sufficient to pilot such adjustment. The amount of manual manipulation of the hand wheel, when making a subsequent manual brake application, would be, accordingly, reduced. Manually operable release means are provided to permit resetting of the slack adjuster to a retracted condition when worn parts are replaced or the cause of excessive slack has been eliminated.

In the single-sheet drawing, FIG. 1 is a schematic view of a truck-mounted type brake apparatus including a slack adjuster device embodying the invention; FIG. 2 is an elevational view, on a larger scale and in section, of the slack adjuster device shown in FIG. 1; and FIG. 3 is a horizontal view, on the same scale and in outline, of a portion of the slack adjuster device shown in FIG. 2.

DESCRIPTION AND OPERATION

The schematic view in FIG. 1 of the drawing is primarily a plan view showing a portion of a railway vehicle truck 1 comprising a bolster 2 having fixed at each end thereof, in usual manner, a side frame 3, only a portion of said side frame at one end of the bolster being shown, it being understood that the other end of the bolster also carries a side frame. The truck 1 further comprises the usual pair of wheel axles with the ends thereof journaled in the side frames, and wheels 4 mounted thereon, one of said wheels and a portion 5 of one of said axles being shown in the drawing.

The fluid pressure operable portion of the brake apparatus mounted on the truck 1 is a well-known type comprising two brake beams represented diagrammatically by lines 6 and 7 disposed parallel to and on opposite side of the bolster 2 and substantially in a plane passing through the axes of the wheel axles 5. The ends of the brake beams 6 and 7 are supported in the side frames 3 adjacent the wheels 4, respectively, and in such manner as to permit generally horizontal movement thereof, in opposite directions, that is, either away from each other or toward each other, parallel to the longitudinal axis of the vehicle. Each end of the brake beams 6 and 7 adjacent the wheels 4 carries thereon a brake head 8 on which a brakeshoe 9 is supported for frictional engagement with the tread of the respective adjacent wheels when moved into contact therewith by movement of the brake beams toward the wheels.

Brake cylinder units 10 and 11 are cooperatively arranged on the brake beams 6 and 7, respectively, for effecting the above-mentioned longitudinal movement of said brake beams. The pistons of the cylinder units 10 and 11 have stems or push rods, represented diagrammatically by the lines 12 and 13, extending therefrom with the opposite ends thereof secured to the brake beams 7 and 6, respectively. When a brake application is initiated and fluid under pressure, as a result thereof, is supplied to a pressure chamber at one side of the piston in each of the brake cylinder units 10 and 11 via respective pipes 14 and 15 (in a manner not deemed essential to an understanding of the present invention), the push rods 12 ans 13 are extended away from the respective cylinder units to exert force on the oppositely arranged brake beams 7 and 6, respectively. Since the cylinder units 10 and 11, as above noted, are mounted on the brake beams 6 and 7, the effect of the force exerted on the brake beams by the push rods 12 and 13 is to cause longitudinal movement of said brake beams away from each other and thereby move the brake shoes 9 into frictional engagement with the respective wheels 4, said force being translated through said brake beams and brakeshoes into a retarding force applied to the wheels. The amount or degree of retarding force, and therefore of the application, is commensurate with the degree of fluid pressure supplied to the cylinder units under the control of the operator. The brake application is released when the operator causes the respective pressure chambers in the brake cylinder units 10 and 11 to be relieved of operating fluid pressure, whereupon respective spring members (not shown) in said brake cylinder units effect return of the pistons and push rods 12 and 13, and, therefore, of the brake beams 7 and 6, respectively, to respective release positions in which the brake shoes 9 are withdrawn from the wheels, such as shown at 4 in FIG. 1.

The hand-operated portion of the brake apparatus, as shown schematically in FIG. 1, comprises a lever system including a dead lever 16 pivotally fulcrumed between its ends on a boss 17 formed on the brake beam 6, and a live lever 18 pivotally fulcrumed between its ends on a boss 19 formed on the brake beam 7. The levers 16 and 18 are similar in length, are fulcrumed at substantially corresponding points between their respective ends, and the bosses 17 and 19 are correspondingly axially located on the respective beams 6 and 7. The upper end, as viewed in the drawing, of dead lever 16 is pivotally connected to one end of an anchoring link 20, the other end of said anchoring link being pivotally anchored to a frame portion 21 of the car. The upper end, as viewed in the drawing, of the live lever 18 is pivotally connected to one end of a chain rod 22, the other end of said chain rod being connected to one end of a hand brake chain 23, only a portion of which is shown.

The chain 23 is arranged in the usual manner with a hand wheel (not shown). By manually turning the hand wheel in one direction, the chain 23 is pulled in a corresponding direction for applying the brakes, said direction being indicated by an arrow in the drawing designated "Application." Turning the hand wheel in the reverse direction permits the chain 23 to be returned, in a manner to be hereinafter set forth, in an opposite direction indicated by an arrow in the drawing designated "Release" for releasing the brakes.

A slack adjuster device 24 has its opposite ends pivotally connected to the respective lower ends, as viewed in FIG. 1, of the dead lever 16 and the live lever 18 to thereby form a connecting link or rod therebetween, thus completing the lever system.

For purposes of convenience, the lever system, immediately above described, is shown in the drawing in the same plane with the bolster 2 and the brake beams 6 and 7. The several levers comprising the lever system, however, when in their actual installed disposition, normally lie in a plane more nearly perpendicular to the longitudinal axes of the bolster 2 and the brake beams 6 and 7.

The slack adjuster device 24, as better seen in FIG. 2, comprises a generally elongated cylindrical casing 25 having formed at one end thereof a yolk 26 by which said slack adjuster device is pivotally connected at said one end to the lower end of live lever 18, the opposite end of said casing being open for coaxially and slidably receiving an internal end of a rod member 27. The other or external end of the rod member 27 is in the form of a yolk having formed in each arm thereof correspondingly disposed elongated slots 28 by which the slack adjuster is connected to the lower end of dead lever 16.

The slack adjuster 24 is provided with a ratchet mechanism 29 comprising a rack 30 formed by a series of notches 31 formed on the internal end of the rod member 27. A pawl member 32, disposed in a recess 33 formed in the casing 25, is urged by a spring 34 into engagement with one of the notches 31 of the rack 30, said pawl member and rack being so arranged as to permit extension of the rod member 27 out of casing 25 but normally prevent retraction thereof into said casing.

The pawl member 32 comprises a pivot member 35 rotatably disposed, with its axis perpendicular to that of the rod member 27, in a recess 36 formed in casing 25 on the opposite side of and axially offset relative to recess 33. The pivot member 35 is retained in recess 36 by the rod member 27 which passes through the pawl member 32 and rests on said pivot member. Thus, in usual manner of ratchet operation, as the rod member 27 is moving out of casing 25 (to be more fully discussed hereinafter), the inclined surface of the particular notch 31 in which the pawl member 32 is then resting acts as a cam during such movement of the rod member and causes rotation of said pawl member about the axis of its pivot member 35 in a counterclockwise direction, as viewed in FIG. 2, against the action of spring 34 until said particular notch moves past said pawl member, whereupon said spring urges the pawl member to drop into the succeeding notch.

A spring seat member 37 is fitted externally over the external end of the rod member 27 and has removably secured therein a pin 38 which passes through the slots 28 in said external end and through a bore in the lower end of the dead lever 16 to provide a lost-motion pivotal connection between said rod member and said dead lever. A spring 39 compressed between the spring seat member 37 and the end of casing 25 exerts oppositely directed forces on said casing and the rod member 27 (acting through pin 38 against the remote ends of slots 28), thereby tending to move the rod member out of the casing, and, in so doing, maintaining the lever system taut. Spring 39 actually does effect extension of the rod member 27 out of casing 25 and thereby adjustment of the pawl 32 to another notch 31 when conditions so demand, as will hereinafter be explained. In addition, spring 39, in cooperation with the spring seat member 37, pin 38, and the slots 28 in the external end of rod member 27, provides a resilient lost-motion connection with the dead lever 16 so as to absorb excessive vibrations in the lever system which could possibly cause an untimely adjustment of the rod member relative to the casing 25.

As seen in FIG. 2, a hand-operated release mechanism comprises a lever 40, pivotally mounted on casing 25 and equipped with a release finger 41 engageable with the pawl member 32. Upon manual rotation of lever 40 in a counterclockwise direction, the release finger 41 engages and forces rotation of the pawl member 32 into a position out of registry with the notches 31. Thus, the rod member 27, for a purpose to be hereinafter disclosed, may be fully retracted into casing 25 by forcing said casing toward spring seat member 37 against the biasing effect of spring 39. When rod member 27 is completely retracted to the position in which it is shown in FIG. 2, the lever 40 is released and the spring 34 biases the pawl member 32 into the notch 31 at the extreme left end of the rack 30, as viewed in the drawing.

In operation, when it becomes necessary to effect a manual brake application, the hand wheel (not shown) of the hand-operated portion of the brake apparatus is rotated in the appropriate direction to cause pull on the chain 23 in the direction indicated by the arrow designated "Application" in FIG. 1 of the drawing. Pull of the chain 23, and therefore of the chain rod 22, in the direction stated, causes the live lever 18 to be initially rotated in a clockwise direction about its pivotal connection on boss 19. Clockwise rotation of live lever 18 and the force transmitted thereby is translated, through the slack adjuster device 24 (acting as a connecting rod) and the dead lever 16 (which is connected to the brake beam 6), into a clockwise moment acting about the pivotal or fulcrum connection of said dead lever on boss 17. Since the anchoring link 20 is fixed to the car frame 21, the moment about the pivotal connection of dead lever 16 on boss 17, causes brake beam 6 to be pushed or moved toward the respective wheels (not shown) adjacent thereto until the respective brakeshoes 9 make contact with said wheels.

With the brakeshoes 9 of the brake beam 6 up against the respective adjacent wheels (not shown), further longitudinal movement of said brake beam, which continues to apply retarding force (through said brakeshoes) on said wheels, is prevented, and therefore, as the live lever 18 continues through further clockwise rotation about its fulcrum connection on boss 19, such rotation of said live lever and the force exerted thereby acts on brake beam 7 to pull it and the brake shoes 9 carried thereby toward the respective adjacent wheels, one of which is shown at 4. When the brake shoes 9 of the brake beam 7 are in contact with the adjacent wheels, further longitudinal movement of the brake beam is precluded, and further effort to pull the chain 23 in the "Application" direction causes additional braking effort to be distributed through the several levers and applied to the wheels, as above described.

It should be apparent that the amount of movement of chain 23 required to bring the brake shoes 9 into frictional contact with the wheels depends upon the amount of slack present in the hand-operated portion of the brake apparatus, such slack, as above noted, usually being caused by worn shoes and wheels, and wear at the various connections of the levers. The slack adjuster 24 is provided for taking up excessive slack in the handtoperated portion of the brake apparatus in the manner to be presently described.

During normal operation of combined hand-operated and fluid pressure brake apparatus on a railway vehicle, the fluid pressure portion of said brake apparatus is operated with a much greater frequency than the hand-operated portion, since the fluid pressure portion is used during all normal braking operations when the vehicle is connected to motive power, whereas the hand-operated portion is used only on such infrequent occasions that the vehicle or car may be moving by freewheeling, as on a hump in railroad yards, for example, in which event a brakeman usually rides with the car and operates the hand-operated portion of the brake apparatus in bringing the car to a stop when desired.

Thus, the wear on the brakeshoes 9, the wheels 4, and the lever connections of the hand-operated portion (because motion of the members 16, 18, 20, 22 and 24 also occurs during operation of the fluid pressure portion) occurs and accumulates gradually and primarily during the frequent operations of the fluid pressure portion of the brake apparatus. When the accumulation of slack in the hand-operated portion of the brake apparatus has attained a prescribed incremental amount, the slack adjuster device 24 operates to take up such slack. As was above noted, during a brake application effected by the fluid pressure portion, the brake beams 6 and 7 are moved longitudinally away from each other in order to bring the shoes 9 against the wheels 4, at which time the rod member 27 and casing 25, though prevented by the ratchet mechanism 29 from contracting, do extend relative to each other an amount corresponding to the amount of longitudinal movement of said brake beams away from each other, which, in turn is affected by the amount of wear on the shoes and wheels.

The axial length of each notch 31 on the rack 30 is so predetermined as to correspond to the incremental amount of accumulated slack, or a maximum slack, in the hand-operated portion at which a slack takeup adjustment is desirable. Thus, when the amount of longitudinal movement of the brake beams 6 and 7 away from each other is equivalent to the maximum slack or axial length of each notch 31, the rod member 27 is extended out of casing 25 an equivalent amount so as to cause the pawl member 32 to ride up over the crest and into the adjacent notch. Such adjustment and takeup of slack occurs each time a fluid-pressure effected brake application coincides with a maximum slack condition. Consequently, when the hand-operated portion of the brake apparatus is used for effecting a manual brake application, the amount of pull of chain 23 will be within practical operating limits.

Either before, or at least when, the pawl member 31, as a result of a series of slack adjustment operations, engages the last notch 31 adjacent the inner end of rod member 27, the worn parts causing the slack in the brake apparatus are replaced, at which time the hand-operated lever 40 is operated, in the manner above set forth, to reset the rod member 27 in its fully retracted position in the casing 25.

Having now described the invention, what we claim as new and desire to secure by Letters Patent, is:

1. Brake apparatus for use on a railway vehicle provided with a plurality of multiple-axle trucks each having a plurality of wheels rotatably mounted thereon, said brake apparatus comprising:
   a. a pair of brake beams mounted on the truck and having mounted thereon brake shoes, said brake beams having respective brake release positions in which the brake shoes are out of contact with the wheels and being movable toward the wheels to respective brake-applying positions in which said brake shoes make frictional contact with the wheels,
   b. fluid pressure means operable responsively to supply of fluid under pressure thereto for effecting movement of said brake beams to their respective brake-applying positions,
   c. respective lever means connected to said brake beams and being operable for effecting movement of said brake beams to their respective brake-applying positions independently of said fluid pressure means, and
   d. hand-operated means for actuating said lever means, wherein the improvement comprises:
   e. a slack adjuster device interposed and serving as a connecting link for transmitting actuating force and motion between said respective lever means effected by said hand-operated means, said slack adjuster device having an initial length in the brake release positions of said brake beams, which length is repetitively incrementally increased by said movement of said brake beams effected by said fluid pressure means coincidental with accumulation of a certain amount of slack in the brake apparatus.

2. Brake apparatus, as defined in claim 1, further characterized in that the length of said slack adjuster device is resiliently extended upon each movement of said brake beams to said brake-applying positions effected by said fluid pressure means and restored upon restoration of said brake beams to said brake release positions.

3. Brake apparatus, as defined in claim 1, wherein said slack adjuster device comprises:
   a. a cylindrical casing member connected to one of said lever means,
   b. a rod member connected to the other of said lever means and slidably received in said cylindrical casing member, and
   c. ratchet means operably interposed between said casing member and said rod member for permitting extension of said rod member out of said casing member and for normally locking the rod member against retraction into said casing member.

4. Brake apparatus, as defined in claim 3, further characterized by manually operable release means for conditioning said ratchet means to unlock and render the rod member retractable into said casing member.

5. Brake apparatus, as defined in claim 3, further characterized by biasing means interposed between said rod member and said cylindrical casing member for biasing both members toward extended relative positions.

6. Brake apparatus, as defined in claim 5, further characterized by a lost motion connection between one end of said slack adjuster device and one of said lever means, said lost motion connection cooperating with said biasing means for absorbing excessive vibrations of the slack adjuster device and preventing unintentional extension of the rod member out of the casing member.

7. A slack adjuster device for use in a combined fluid pressure and hand-operated railway vehicle brake apparatus in which the hand-operated portion comprises a lever system through which braking effort applied by the hand-operated portion of the brake apparatus is transmitted to the vehicle wheels, said slack adjuster device being operably connected in the lever system to serve as a connecting link between two levers of the lever system and comprises, in combination:
   a. a cylindrical member open at one end and connected at the other end to one of the two levers,
   b. a rod member having an inner end slidably received in the open end of said cylindrical member and being connected at an outer end to the other of the two levers, and
   c. ratchet means carried partly on said cylindrical member and partly on said rod member for controlling incremental axial adjustment of said rod member relative to said cylindrical member,
   d. said ratchet means being normally effective for locking said rod member against axial movement in one direction and being operable, incidental to a particular brake application effected by the fluid pressure portion of the brake apparatus and coincidental with an accumulation of a predetermined amount of slack due to wear in the brake apparatus, for effecting said incremental axial adjustment of the rod member in a direction opposite to said one direction each time an accumulation of said predetermined amount of slack occurs.

8. A slack adjuster device, as set forth in claim 7, further characterized by manually operable means mounted on said cylindrical member and operable to a release position in which the ratchet means is conditioned for unlocking and rendering said rod member movable in said one direction.

9. A slack adjuster device, as set forth in claim 7, wherein said ratchet means comprises:
   a. a rack formed on the inner end of said rod member,
   b. a pawl member pivotally mounted on said cylindrical member, and
   c. biasing means for yieldingly biasing said pawl member into engagement with said rack for effecting said locking of the rod member against retraction thereof into said cylindrical member, said pawl member being yieldingly pivotable out of engagement with said rack for effecting incremental extension of said rod member out of said cylindrical member.

10. A slack adjuster device, as set forth in claim 9, further characterized by spring means interposed between said rod member and said cylindrical member for exerting a biasing effect on both members and effecting said incremental extension of the rod member upon occurrence of said particular brake application.

11. A slack adjuster device, as set forth in claim 9, further characterized by a manually operable release lever pivotally mounted on the cylindrical member and effective, when manually rotated in a certain direction, for operating said pawl member to a disengaged position relative to said rack and in which position the rod member is rendered retractable into the cylindrical member.